L. P. BENSON.
ANIMAL TRAP.
APPLICATION FILED NOV. 8, 1915.
1,197,595.
Patented Sept. 12, 1916.
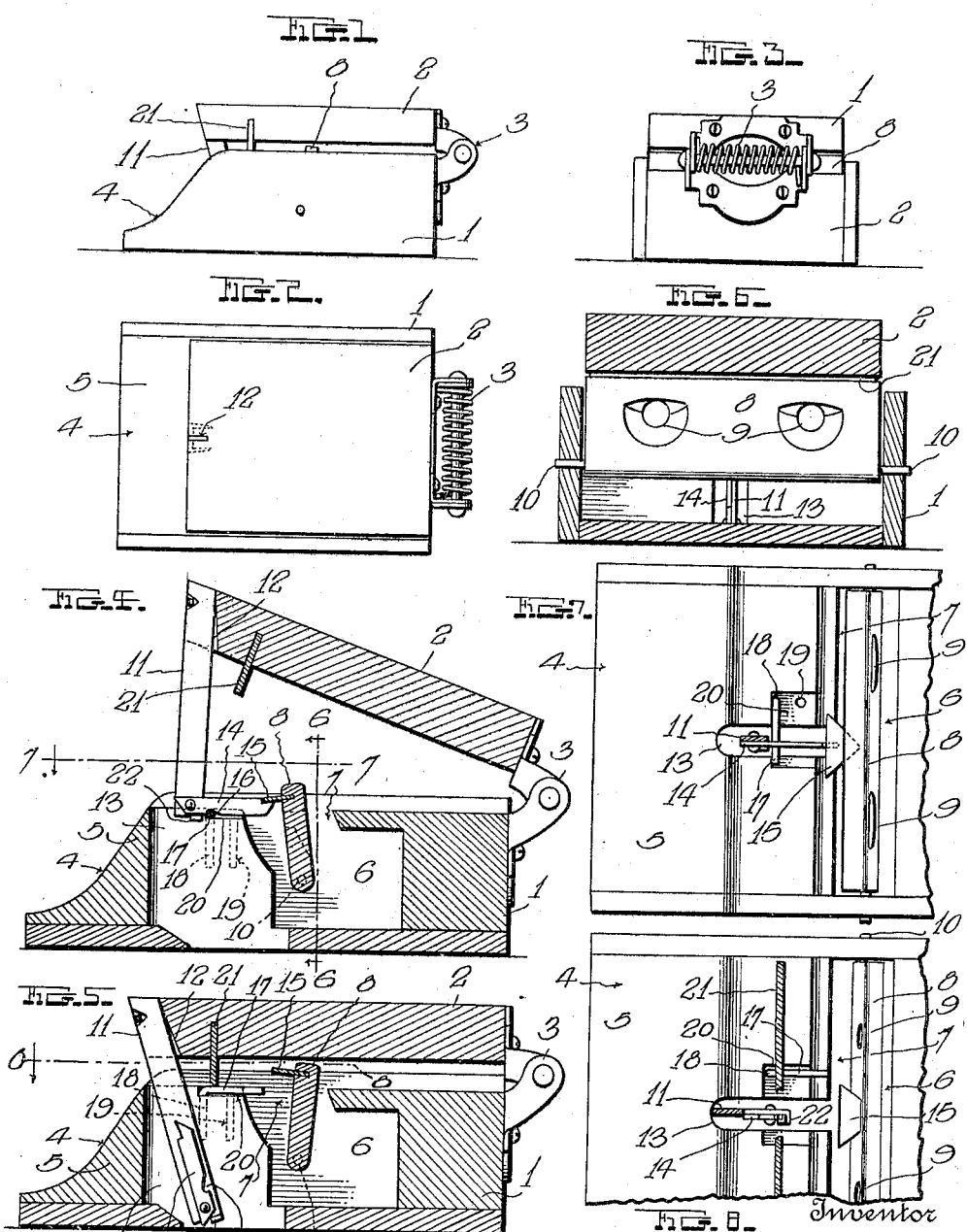
Witnesses
H Woodard
R. F. Freund
Inventor
Lars P. Benson
by H R Wilson &co
Attorneys

UNITED STATES PATENT OFFICE.

LARS P. BENSON, OF MINNEAPOLIS, MINNESOTA.

ANIMAL-TRAP.

1,197,595.  Specification of Letters Patent.  Patented Sept. 12, 1916.

Application filed November 8, 1915. Serial No. 60,313.

*To all whom it may concern:*

Be it known that I, LARS P. BENSON, a citizen of the United States, residing at Minneapolis, in the county of Hennepin and State of Minnesota, have invented certain new and useful Improvements in Animal-Traps; and I do declare the following to be a full, clear, and exact description of the invention, such as will enable others skilled in the art to which it appertains to make and use the same.

This invention relates to improvements in animal traps and has for its principal object to provide such a trap which will be actuated by the movable closure of a bait receptacle disposed between the jaws of the trap.

A further object is to provide a very simply constructed trap which can be very inexpensively manufactured.

With the above and minor objects in view, my invention resides in certain novel features of construction, combination and arrangement of parts which will hereinafter be more particularly described and claimed.

In the accompanying drawings: Figure 1 is a side elevation of my improved trap in inoperative position; Fig. 2 is a top plan view thereof; Fig. 3 is a rear end view; Fig. 4 is an enlarged central vertical longitudinal section with the trap in operative position; Fig. 5 is a similar view showing the trap in inoperative position; Fig. 6 is a vertical transverse section on the line 6—6 of Fig. 4; Fig. 7 is a horizontal section on the line 7—7 of Fig. 4; Fig. 8 is a similar view on the line 8—8 of Fig. 5, the animal striking rib being shown in section and partly broken away to more clearly disclose the parts thereberneath.

In its preferred form, my invention comprises a stationary member 1 and a movable plate like jaw member 2 hinged thereto preferably by a spring hinge 3. The stationary member 1 is substantially rectangular in form, but it has one end beveled as shown at 4 to form an entrance way for the animal attracted to the trap. This beveled portion 4 is formed on a block 5 which constitutes the forward portion of the stationary member, the rear portion of said member being in the form of a bait receptacle 6 having its forward side open.

A space 7 is left between the block 5 and the bait receptacle 6 and is adapted to be occupied by a pivoted closure in the form of a bar 8 for said bait receptacle. This closure is provided with a plurality of openings 9 in order that the animal may scent the bait within the receptacle and be attracted thereto, and is preferably pivoted at its lower end by pivot pins 10 which extend through the side walls of said stationary member and into the ends of said closure. These side walls of the stationary member extend slightly above the tops of the bait receptacle and block 5, thereby forming flanges between which and the movable jaw member 2 the animal will be caught if it tries to get to the bait from the sides of the trap.

The jaw member 2 has an arm 11 depending from its front or forward edge, said arm being placed in a notch 12 in the edge of said jaw member and securely held therein. When the jaw is down or in inactive position, the arm 11 extends into a slot 13 formed in the block 5. A latch member 14 is pivoted at one end to the lower end of the depending arm 11, its free end being adapted to coact with a stop 15 carried by the movable closure 8 and projecting from the front side thereof. The end of the latch member 14 is inclined to form a seat for this stop 15 on the closure, while its lower edge is notched at 16 adjacent its pivoted end. This notch 16 forms a seat for a fulcrum pin 17 which, when the trap is in active position extends across the slot 13 in the block 5 and supports the jaw member 2.

To set the trap the jaw 2 is raised, the fulcrum pin placed across the notch 13 and the latch member swung to a substantially horizontal position with its notch disposed on the fulcrum pin, and the pivoted closure 8 is then moved forward until the stop carried thereby is in position to coact with the free end of the latch member. When the parts are in this position, the jaw member 2 may be released and will remain in elevated position until the pivoted closure 8 is actuated to release the latch member when the same will swing around its pivot and the jaw 2 will be forced downwardly by the tension of the spring hinge by which it is connected to the stationary member.

The fulcrum pin 17 has a depending shank 18 which is disposed in one of the sockets 19 formed in the block 5 adjacent the slot 13 therein. The part of the block 5 which receives the fulcrum pin is recessed as shown at 20 so as to keep said pin in a plane below the top of the block. The aforementioned sockets 19 are formed in this recessed portion 20 as shown. A number of sockets are provided so that the fulcrum pin may be changed to any one of them in order that the tension of the jaw 2 may be varied, so that the trap may be sprung with greater or less ease. It is obvious that the farther the fulcrum pin is placed from the hinged end of the jaw, the easier the trap may be sprung. In addition to these features, the jaw 2 is also provided with a transversely extending striking blade 21 on its lower face in a position to strike the animal which has sprung the trap and thereby securely hold it and more quickly cause its death. Also, the lower end of the depending arm is offset as shown at 22 to prevent the latch member from dropping below a substantially horizontal position, and thereby enabling the trap to more readily set. To aid in setting the trap, the pivoted closure 8 is extended above the flanges of the side walls of the stationary member so that the finger of the person setting the trap may readily remove said closure without danger of his finger becoming caught beneath the jaw 2.

From the foregoing description, taken in connection with the accompanying drawings, it is obvious that I have produced a very simple and inexpensively constructed trap which, because of its simplicity will be very effective. It is also evident that this trap may be readily made in various sizes according to the animals which it is desired to catch.

I claim as my invention:—

1. A trap comprising a stationary member, a movable jaw hinged thereto, a bait receptacle, an arm depending from the free end of said hinged jaw, a latch member pivoted to said arm, and a movable closure for said bait receptacle adapted to coact with said latch member and to form a trip therefor to release the movable jaw.

2. A trap comprising a stationary member, a movable jaw hinged thereto, a bait receptacle, an arm depending from the free end of said hinged jaw, a latch member pivoted to said arm, a fulcrum pin adapted to support said latch member when the same is in operative position, and a movable closure for said bait receptacle, a stop thereon adapted to coact with the latch member, said closure forming a trip to release the movable jaw.

3. A trap comprising a stationary member, a movable jaw hinged thereto, a bait receptacle, an arm depending from the free end of said hinged jaw, a latch member pivoted to said arm, an adjustable fulcrum pin whereby the force necessary to spring the trap is varied, said pin being adapted to support said latch member when the same is in operative position, and a movable closure for said bait receptacle, a stop thereon adapted to coact with the latch member, said closure forming a trip to release the movable member.

4. A trap comprising a stationary member, said stationary member having a plurality of sockets formed therein adjacent its forward end and arranged in its top, a movable jaw hinged thereto, a bait receptacle, an arm depending from the free end of said hinged jaw, a latch member pivoted to said arm, an adjustable fulcrum pin having an upright shank adapted to be inserted in any one of said plurality of sockets, whereby the force necessary to spring the trap is varied, said pin being adapted to support said latch member when the same is in operative position, a movable closure for said bait receptacle, and a stop thereon adapted to coact with the latch member, said closure forming a trip to release the movable jaw.

In testimony whereof I have hereunto set my hand in presence of two subscribing witnesses.

LARS P. BENSON.

Witnesses:
E. V. JOHNSON,
J. F. CONROY.

Copies of this patent may be obtained for five cents each, by addressing the "Commissioner of Patents, Washington, D. C."